United States Patent
Browarnik et al.

(10) Patent No.: US 12,062,026 B2
(45) Date of Patent: Aug. 13, 2024

(54) IDENTIFYING AND RETRIEVING VIDEO METADATA WITH PERCEPTUAL FRAME HASHING

(71) Applicant: Painted Dog, Inc., New York, NY (US)

(72) Inventors: Jared Max Browarnik, Brooklyn, NY (US); Ken Aizawa, Brooklyn, NY (US)

(73) Assignee: Painted Dog, Inc., New York, NY (US)

( * ) Notice: Subject to any disclaimer, the term of this patent is extended or adjusted under 35 U.S.C. 154(b) by 0 days.

(21) Appl. No.: 18/353,426

(22) Filed: Jul. 17, 2023

(65) Prior Publication Data
US 2024/0013178 A1    Jan. 11, 2024

Related U.S. Application Data

(62) Division of application No. 17/714,533, filed on Apr. 6, 2022, now Pat. No. 11,727,375, which is a division
(Continued)

(51) Int. Cl.
*G06Q 20/12* (2012.01)
*G06F 9/54* (2006.01)
(Continued)

(52) U.S. Cl.
CPC .......... *G06Q 20/123* (2013.01); *G06F 9/547* (2013.01); *G06F 16/2255* (2019.01);
(Continued)

(58) Field of Classification Search
CPC ... G06Q 20/123; G06F 16/71; G06F 16/2255; G06F 16/7867; G06F 9/547;
(Continued)

(56) References Cited

U.S. PATENT DOCUMENTS

| 8,494,234 B1 | 7/2013 | Bozinovic et al. |
| 11,321,389 B2 | 5/2022 | Browarnik et al. |

(Continued)

FOREIGN PATENT DOCUMENTS

WO    2017146990 A1    8/2017

OTHER PUBLICATIONS

Extended European Search Report in European Application No. 20834443.2 dated Jun. 21, 2023, 12 pages.
(Continued)

*Primary Examiner* — Sunghyoun Park
(74) *Attorney, Agent, or Firm* — Smith Baluch LLP

(57) ABSTRACT

Shoppable video enables a viewer to identify and buy items appearing in a video. To retrieve information about the items in a frame of the video, the playback device generates a perceptual hash of that frame and uses that hash to query a first database storing perceptual hashes of different version of the video. The database query returns an identifier for the frame, which is then used to query a second database that store the item information. The results of this query are returned to the playback device, which shows them to the user, enabling the viewer to learn more about and possibly purchase the item. Using queries based on perceptual hashes of different versions of the video increases the likelihood of returning a match, despite formatting differences. And using separate hash and metadata databases makes it possible to update the metadata without changing the hashes.

17 Claims, 3 Drawing Sheets

Related U.S. Application Data of application No. 17/271,061, filed as application No. PCT/US2020/040584 on Jul. 2, 2020, now Pat. No. 11,321,389.

(60) Provisional application No. 62/870,127, filed on Jul. 3, 2019.

(51) Int. Cl.
| | |
|---|---|
| *G06F 16/22* | (2019.01) |
| *G06F 16/71* | (2019.01) |
| *G06F 16/78* | (2019.01) |
| *G06V 10/764* | (2022.01) |
| *G06V 10/77* | (2022.01) |
| *G06V 20/40* | (2022.01) |
| *H04N 21/472* | (2011.01) |
| *H04N 21/478* | (2011.01) |

(52) U.S. Cl.
CPC .......... *G06F 16/71* (2019.01); *G06F 16/7867* (2019.01); *G06V 10/764* (2022.01); *G06V 10/7715* (2022.01); *G06V 20/40* (2022.01); *H04N 21/47217* (2013.01); *H04N 21/47815* (2013.01); *G06V 20/48* (2022.01); *G06V 2201/10* (2022.01)

(58) Field of Classification Search
CPC .. G06V 10/7715; G06V 20/40; G06V 10/764; G06V 20/48; G06V 2201/10; H04N 21/47217; H04N 21/47815
See application file for complete search history.

(56) References Cited

U.S. PATENT DOCUMENTS

| | | |
|---|---|---|
| 2008/0313140 A1 | 12/2008 | Pereira et al. |
| 2009/0074235 A1 | 3/2009 | Lahr et al. |
| 2012/0013770 A1 | 1/2012 | Stafford et al. |
| 2014/0129627 A1 | 5/2014 | Baldwin et al. |
| 2014/0201769 A1 | 7/2014 | Neumeier et al. |
| 2014/0289315 A1 | 9/2014 | Harrison |
| 2015/0120750 A1 | 4/2015 | Hefeeda et al. |
| 2015/0242399 A1* | 8/2015 | Ramanathan ....... G06F 16/2255 707/723 |
| 2016/0267179 A1 | 9/2016 | Mei et al. |
| 2017/0004364 A1 | 1/2017 | Lahr et al. |
| 2017/0034591 A1 | 2/2017 | Ray et al. |
| 2019/0042853 A1 | 2/2019 | Kerl |
| 2019/0129806 A1* | 5/2019 | Hsu ....................... G06F 3/0641 |
| 2019/0251114 A1* | 8/2019 | Pereira ................ G06F 16/7847 |
| 2020/0026949 A1 | 1/2020 | Alcock et al. |
| 2020/0117904 A1 | 4/2020 | van Oldenborgh et al. |

OTHER PUBLICATIONS

International Search Report and Written Opinion in International Patent Application No. PCT/US2020/040584 mailed Sep. 25, 2020, 19 pages.

Kjelsrud, Using Perceptual Hash Algorithms to Identify Fragmented and Transformed Video Files. MS thesis. 2014. 50 pages.

Vega et al. "A robust video identification framework using perceptual image hashing." 2017 XLIII Latin American Computer Conference (CLEI). IEEE, 2017. 10 pages.

Anonymous: "Nearest neighbor search—Wikipedia", Jul. 25, 2018, XP093171285, Retrieved from the Internet: URL: https://web.archive.org/web/20180725160114/https://en.wikipedia.org/ wiki/Nearest_neighbor_search, 8 pages.

Anonymous: "Similarity search—Wikipedia", Jul. 30, 2018, XP093171274, Retrieved from the Internet: URL:https://web.archive.org/web/20180730071954/https://en.wikipedia.org/ wiki/Similarity_search, 3 pages.

Office Action in European Application No. 20834443.2 dated Jun. 11, 2024, 10 pages.

\* cited by examiner

IDENTIFYING AND RETRIEVING VIDEO METADATA WITH PERCEPTUAL FRAME HASHING

CROSS-REFERENCE TO RELATED APPLICATIONS

This application is a divisional of U.S. application Ser. No. 17/714,533, filed on Apr. 6, 2022, which is a divisional of U.S. application Ser. No. 17/271,061, filed on Feb. 24, 2021, which is a national-stage application, under 35 U.S.C. § 371, of International Application No. PCT/US2020/040584, filed on Jul. 2, 2020, and which in turn claims the priority benefit, under 35 U.S.C. § 119(e), of U.S. Application No. 62/870,127, filed on Jul. 3, 2019. Each of these applications is incorporated by reference in its entirety.

BACKGROUND

A shoppable video allows a viewer watching the video to shop for fashion, accessories, homeware, technology devices, and even menu and recipe items that appear in the video. As the viewer watches the video, they might see an item appearing in the video that they want to buy. They can get information about that item, including its price and availability, by pressing a button on a remote control or speaking into a microphone on the remote control. A processor in or coupled to the television receives this request and transmits it to a server, which retrieves the information about the item from a database and returns it to the processor. The television displays this information about the item to the viewer, who can then buy the item or request information about similar products.

Shoppable videos are typically tagged before they are displayed on television, either manually or using machine learning techniques to recognize products in each video frame. The product metadata for the tagged products is matched to the corresponding video frames and stored in the database. When the viewer requests the product metadata, the processor identifies the corresponding video frames, then retrieves the product metadata for those video frames.

SUMMARY

One challenge with shoppable video is matching a viewer's request for information about products in a video frame to information in a database. The same shoppable video may be displayed in one of many different formats, complicating the ability to match the video frame being displayed to a corresponding video frame. It is impractical to tag each possible format and store information for each of the corresponding frames, in part because the number of possible formats increases over time.

The present technology addresses this challenge by identifying a frame of a source video using perceptual hashing. In one example of this method, a processor generates hash vectors for respective frames of different versions of the source video. These hash vectors are associated with information about the source video in a database. When a playback device, such as a smart television, television with a set-top box, computer, or mobile device, plays a first version of the source video, it generates a first hash vector for a first frame of the first version of the source video. This first hash vector is matched to a matching hash vector among the hash vectors in the database, e.g., using an application programming interface (API) to query the database. In response to matching the first hash vector to the matching hash vector, the information about the source video is retrieved from the database.

Determining that the first hash vector matches the matching hash vector may include determining that the first hash vector is within a threshold distance of the matching hash vector. The matching hash vector can be for a frame in a second version of the source video that is different than the first version of the source video.

The hash vectors and the first hash vector can be generated with a perceptual hashing process, such perception hashing (pHash), difference hashing (dHash), average hashing (aHash), and wavelet hashing (wHash). Generating the first hash vector can take about 100 milliseconds or less. The first hash vector may have a size of less than or equal to 4096 bits. Generating the first hash vector may occur automatically at regular intervals and/or in response to a command from a viewer.

If desired, the hash vectors can be sharded for storage in a sharded database. Put differently, the hash vectors can be separated or divided into subsets, with each subset stored in a different shard of the database. The hash vectors can separated into subsets randomly or based on how frequently or how recently the hash vectors are accessed, distance among the hash vectors, and/or features of the hash vectors.

The present technology can also be used to identify and obtain metadata associated with a source video. Again, a processor generates hash vectors for respective frames of at least one version of the source video and stores the hash vectors in a first database. A second database stores metadata corresponding to the respective frames. (This metadata can be updated without changing the hash vectors in the first database.) A playback device plays a first version of the source video. The playback device or an associated processor generates a first hash vector for a first frame of the first version of the source video. An API server matches the first hash vector to a matching hash vector among the hash vectors in the first database. In response to matching the first hash vector to the matching hash vector, the API retrieves the metadata corresponding to the matching hash vector from the second database, and the playback device displays the metadata to the viewer.

The metadata may represent at least one of a location in the source video, a garment worn by an actor in the source video, a product appearing in the source video, or music playing the source video. The hash vectors may be associated with the metadata by respective timestamps.

Matching the first hash vector to the matching hash vector may include transmitting the first hash vector to the API server. The API server determines that the first hash vector matches the matching hash vector, then identifies the timestamp associated with the matching hash vector in the first database. In this case, retrieving the metadata further comprises querying the second database based on the timestamp and retrieving the metadata associated with the timestamp from the second database. Determining that the first hash vector matches the matching hash vector may include that the first hash vector is within a threshold distance of the matching hash vector.

A method for identifying, obtaining, and displaying metadata associated with a video may also include playing the video via a display, generating a first hash vector for a first frame of the video, transmitting the first hash vector to an API server, and obtaining, via the API server, the metadata associated with the first frame from a metadata database. The metadata is retrieved from the first database in response to matching the first hash vector to a second hash vector stored in a hash vector database. The display shows the metadata associated with the first frame to a user.

From another perspective, a database receives a first hash vector generated for a first frame of a video. The database stores the first hash vector and receives a query based on a second hash vector from a playback device. The database performs the query for the second hash vector and, in response to matching the second hash vector to the first hash vector, transmits a timestamp associated with the first hash vector to an API. This timestamp associates metadata with the first frame of the video.

In another example, a processor generates a first hash vector for a first frame of a source video. A first database stores the first hash vector in a first database. A playback device plays a version of the source video. The same processor or another processor generates a second hash vector for a second frame of the version of the source video. The second hash vector is matched to the first hash vector in the first database. In response to matching the second hash vector to the first hash vector, a timestamp corresponding to the second hash vector can be retrieved and transmitted to the playback device.

All combinations of the foregoing concepts and additional concepts are discussed in greater detail below (provided such concepts are not mutually inconsistent) and are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., elements that are functionally and/or structurally similar).

DETAILED DESCRIPTION

Figure 1:
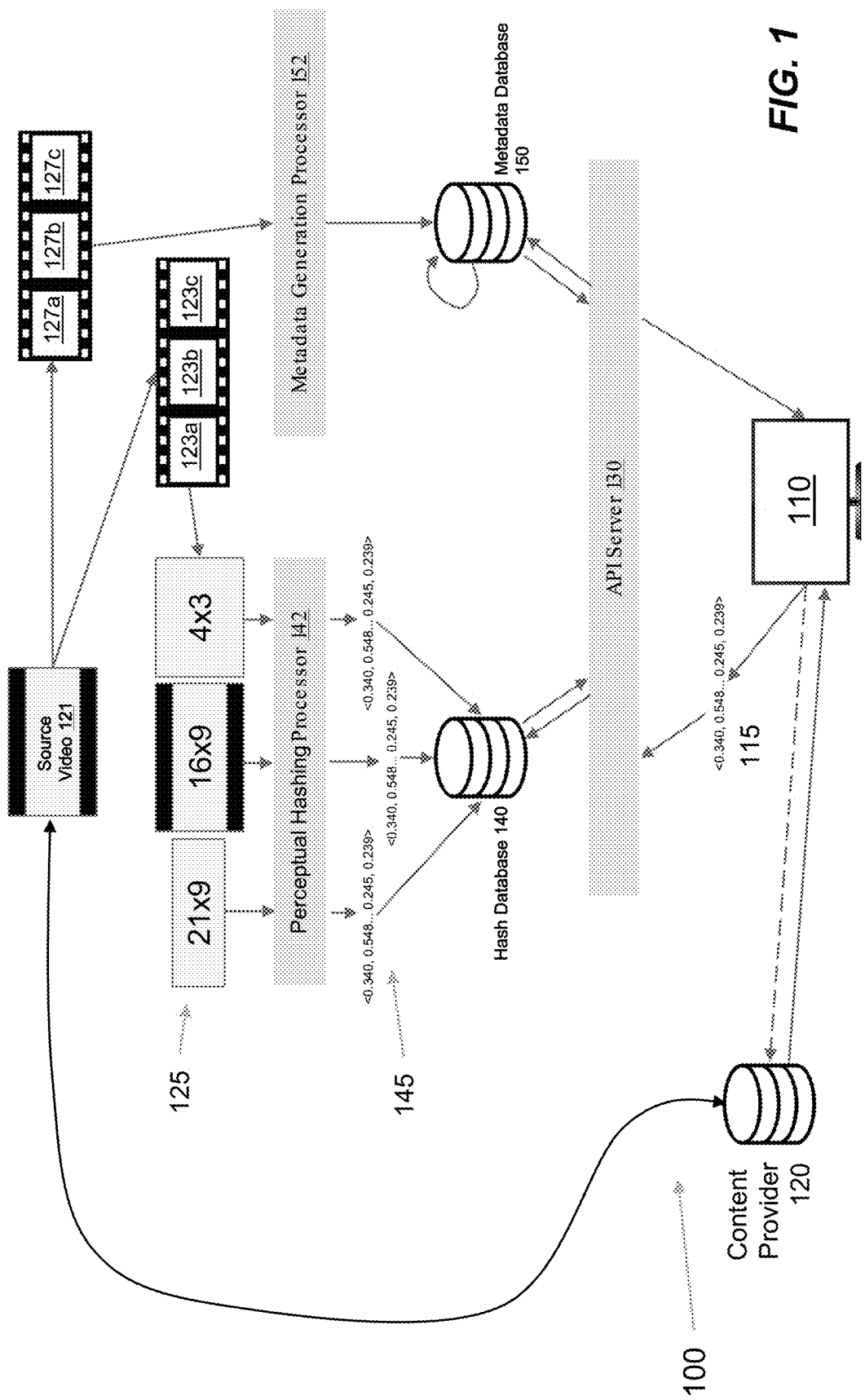
FIG. 1 illustrates a system that enables immediate access to elements in a video.

The technology disclosed herein helps provide television viewers with immediate access to information about products, locations, and other things shown in videos. More specifically, the technology disclosed herein reduces the time and/or friction between identifying elements (e.g., products, locations, etc.) in a video that is being displayed and displaying about information these elements to the viewer. The viewer can then save the information and/or purchase a product that they like in the video.

The present technology uses perceptual hashing to identify video frames shown to a viewer on a playback device. To get information about an item in a video frame, the playback device generates a perceptual hash of the frame image and sends that hash to a server, which queries a hash database containing perceptual hashes and timestamps or other identifiers for frames from a variety of videos in a range of different formats. This query returns the identifier, which can be used to query a separate database for information, or metadata, about the item in the frame or for audience surveys or other data harvesting operations. Alternatively, the metadata may be stored in the same database as the hashes and returned together with the identifier. This metadata may include information about a location, garment, product, music, or sports scores from the source video, or more information about the video itself (e.g., runtime, synopsis, cast, etc.). The server may return this information or metadata to the playback device, which may subsequently display it to the user.

Using perceptual hashes offers a number of advantages over other techniques for identifying video frames and objects in those video frames. To start, transmitting perceptual hashes consumes less upstream bandwidth than transmitting video frames or other identifying information. Generating and matching perceptual hashes does not require any specialized hardware. Perceptual hashes are very robust to degradation of video quality, making correct matches more likely over a wider range of video viewing and transmission conditions. It also preserves the viewer's privacy: without a hash database, there is no way anyone who intercepts the perceptual hash would have any indication of the content being displayed on the playback device. And for any content that is owned only by the viewer (e.g., a home movie), there is effectively no way any person (even with a hash database as previously described) could identify what is being displayed on the playback device based on the hash value. This is because there is nearly an infinite number of images one could generate that result in the same hash value, so it is practically impossible to guess or reverse engineer the source image from the hash. (Technically, multiple frames can produce the same hash vector, but for a 512-bit hash vector, there are $2^{512}$ possible hash vectors (1 with 154 zeros after it), so the compressed hash space is large enough to encode a nearly infinite number of frames without encoding different frames using the same hash vector.)

In addition, bifurcating the hash and metadata databases (as opposed to associated item information with the hashes in the same database) makes it possible to update the metadata associated with a given frame without having to affect the hash database. For example, metadata about the products that appear in a given piece of content can be updated as frequently as their stock/price change without necessitating any changes to the hash database.

FIG. 1 illustrates a system 100 that enables immediate access to elements in a source video 121 that can be displayed in one of several formats 125 on a playback device 110, such as a smart TV, television with a separate set-top box, computer, tablet, or smart phone coupled to a content provider 120. This source video 121 may be provided by a content partner (e.g., Hallmark Channel may provide the source video 121 for an episode before it airs), a distribution partner (e.g. Comcast), downloaded off the internet (e.g., from YouTube), or captured from a live video feed (e.g., a live capture of the feed of an NBA game). The system 100 includes a hash database 140 and a metadata database 150 that are communicably coupled to an application programming interface (API) server 130, which is also communicably coupled to the playback device 110. For example, the playback device 110, content provider 120, API server 130, hash database 140, and metadata database 150 can be in the same or different geographic locations, operated by the same or different parties, and can communicate with each other via the internet or one or more other suitable communications networks.

(Depending on the content source, the system 100 may perform some steps in addition to those shown in FIGS. 1-4. For example, in the case of a set-top box, the content may be delivered from the content provider 120 (e.g., Disney), to the cable company (e.g., Comcast), which play the content back on the playback device.)

Figures 2, 3:
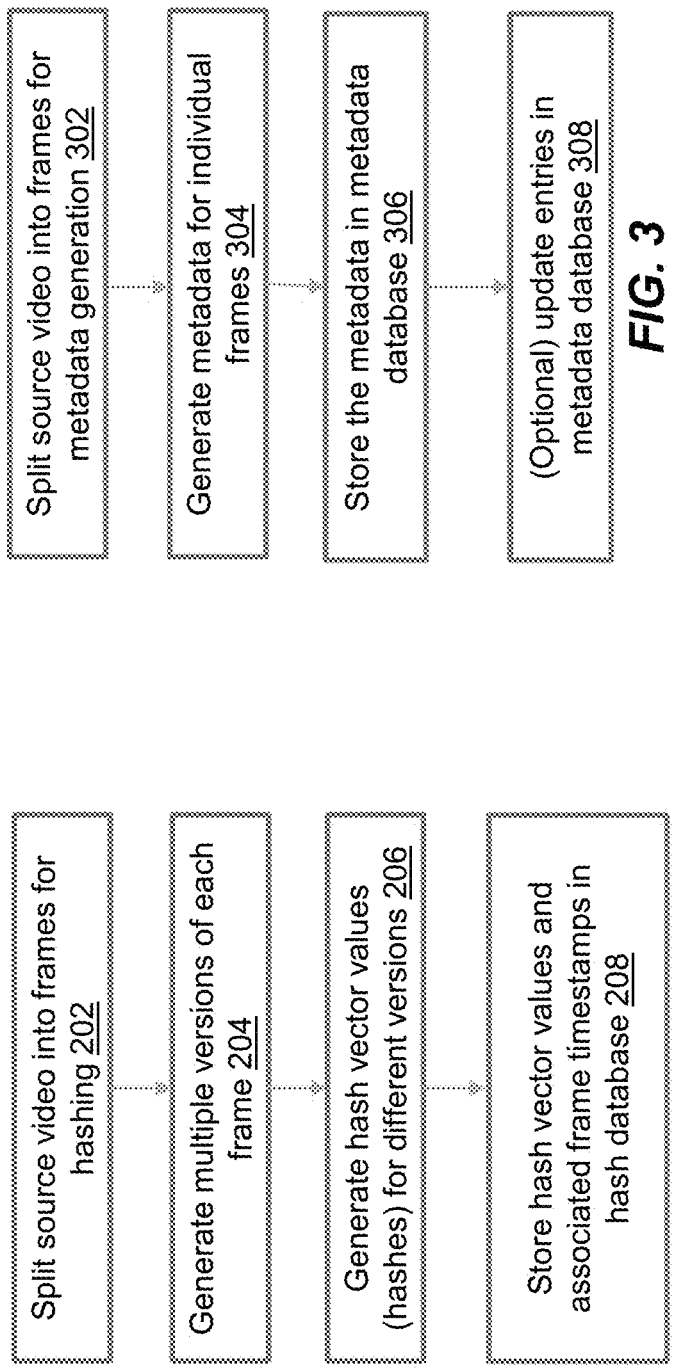
FIG. 2 is a flow diagram illustrating a process for generating and storing hash vectors for different versions of a source video.
FIG. 3 is a flow diagram illustrating a process for generating and storing metadata for a source video.
Figure 4:
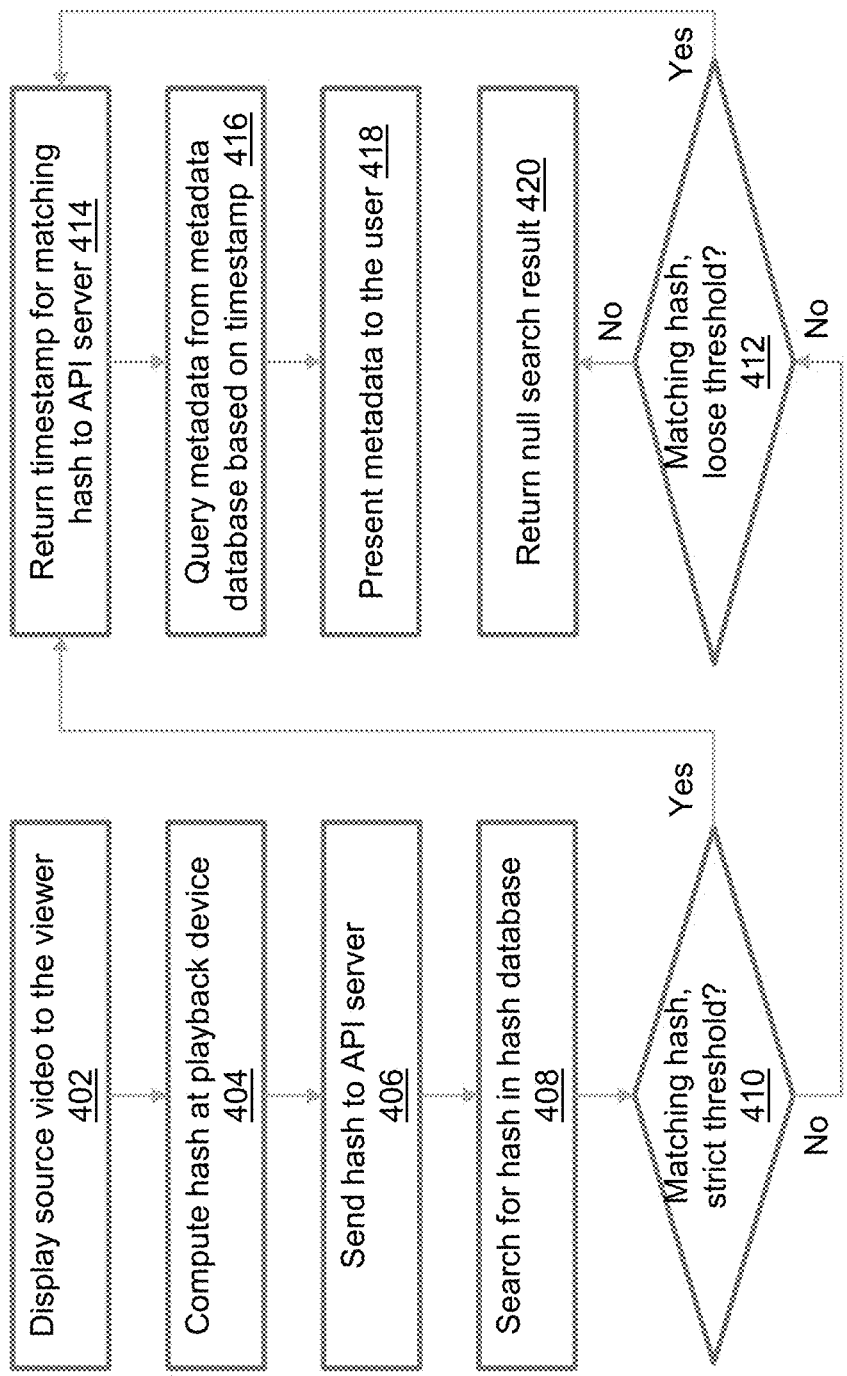
FIG. 4 is a flow diagram illustrating a process for retrieving metadata about objects in a video using perceptual frame hashing.

FIGS. 2-4 illustrate processes for populating and retrieving information from the hash database 140 and metadata databases 150. FIG. 2 shows that how the hash database 140 is populated with hash vectors 145, also called hash value vectors, hash values, or hashes. First, the source video 121 is split into multiple individual frames 123a-123c (collectively, frames 123) (block 202). This split may be made at a constant frame rate (e.g., at 12 fps) or may be guided by a metric indicating how significantly the content of the video is changing from frame to frame, with a split occurring every time the video content changes by more than a threshold amount, which can be based on the hash-matching threshold or chosen experimentally based on a desired level of hash-matching accuracy. This reduces the number of hashes to store in the database Multiple versions 125 of each source frame 123 may be created (block 204), with modifications made to the aspect ratio (e.g., 21×9 or 4×3 instead of 16×9), color values, or other parameters, with the goal of replicating the variety of ways the source video 121 may be displayed on the playback device 110 after passing through broadcast transcoding systems, etc.

Each version 125 of every source frame 123 is run through a perceptual hashing process by a hash generation processor 142 (block 206). This hash generation processor 130 converts each frame version 125 into a corresponding perceptually meaningful hash vector 145. The hash generation processor 142 may use one or more perceptual hashing processes, such as perception hashing (pHash), difference hashing (dHash), average hashing (aHash), or wavelet hashing (wHash), to generate the hash vectors 145. The hash vectors 145 may be fixed-size binary vectors (N×1 vectors, with each element in the vector containing either a 1 or 0) or floating point vectors. The hash vectors 145 can be any of a variety of sizes, including but not limited to 128 bits, 256 bits, 512 bits, 1024 bits, 2048 bits, 4096 bits, or larger. The hash vectors 145 for different versions 125 of the same source frame 123 may be close to or far from each other, depending on their visual similarity. For instance, versions 125 with slight differences in color may have hash vectors 145 that are close enough to each other to be matched, whereas versions 125 with different aspect ratios (e.g., 4:3 versus 16:9) may have hash vectors 145 that are so far from each other that they would not be matched to each other.

Considerations for choosing the perceptual hashing process and the size of the hash vector 145 include:
(1) How quickly the hash can be calculated on the inexpensive hardware in the playback device 110 (e.g., a processor in a Smart TV or set-top box (STB)), with an example target time of calculating the hash vector of about 100 ms or less.
(2) The size of the hash vector 145. Smaller hash vectors 145 allow for reduced bandwidth consumption among the playback device 110, API server 120, and hash database 140, reduced memory requirements for the hash database 140, and shorter search times. dHash at a size of 16×16 has a 512-bit output. Larger hash vectors 145 allow for more precise matching but consume more bandwidth and have longer search times.
(3) The chance of collision (the chance of two different images producing the same hash vector). The hash vector computation speed and size should be weighed against the ability of the hashing process to accurately produce distinct hashes for two similar but different inputs. For example, running dHash at a size of 32×32 (as opposed to 16×16) yields a hash vector of size 2048 bits, which allows for more precise discrimination between frames (i.e., higher accuracy) at the cost of quadrupling the memory storage space. In some use cases this may be a worthwhile tradeoff, while not in others.

The hash vectors 145 are stored in the hash database 140 (block 208), which is configured to allow for quick (e.g., <100 ms) and high throughput (e.g., thousands of searches per second) approximate nearest-neighbor searches of the hash vectors 145. While FIG. 1 represents this hash database 140 as a singular entity, in reality the hash database 140 may include multiple shards, each of which contains a subset of the hash vectors 145. The hash vectors 145 may be randomly distributed across the shards or they may be distributed deliberately according to a specific scheme. For example, the hash database 140 may store similar (close in distance) vectors 145 on the same shard. Or the hash database 140 may store the most frequently or most recently accessed vectors 145 on the same shard. Or the hash database 140 may use the features of the hash to decide which shard to place it on (e.g., using Locality Sensitive Hashing, or a learned process, such as a neural network that is trained on a subset of the hashes).

Sharding allows each subset of vectors 145 to be searched concurrently and the results aggregated, keeping the search time low even when many hash vectors 145 are being searched. The shards can also be searched sequentially, e.g., in the case where the shards are organized by access frequency, with the shard storing the most frequently accessed vectors 145 searched first, then the shard storing the second-most frequently accessed vectors 145 searched second, and so on until a match is found. In addition, all hashes from a given video may be treated as a group in this scheme or others, in that if the search volume for one or more hashes from a given video increases, all of the hashes for that video may be promoted to the first shard concurrently, in anticipation of more searches on the rest of the hashes for that video. (Testing shows that, using commercially available hardware and software, each database shard can handle at least a few hundred million hash vectors 145, with the total system 100 capable of handling billions of hash vectors 145.) When this system 100 is used for live events (i.e. a live basketball game), the time from inserting a new hash 145 into the database 140 to that hash vector 145 being indexed and available for search should be low (e.g., less than five seconds).

Each hash vector 145 is associated in the hash database 140 with information identifying the corresponding source video 101 and a timestamp and/or frame number/identifier for the corresponding frame 123/125. In some cases, different versions 125 of the same source frame 123 may have different absolute timestamps due to editing for content or length. In these cases, each hash vector 145 may also be associated with a timestamp offset that indicates the difference between the timestamp for the associated frame version 125 and the timestamp for the corresponding frame 123 of the source video 101. The hash database 140 can return the timestamp, timestamp offset, and source video information in response to a hash vector query for querying the metadata database 150.

FIG. 3 illustrates how the metadata for the source video 121 is generated. The source video 121 is split into another set of frames 127a-127c (collectively, frames 127) for metadata generation and tagging (block 302). The set of frames 127 for metadata generation may be smaller than the set of frames 123 for hashing because the frame rate can be lower for metadata generation than for perceptual hashing. The splits between the frames 127 for metadata generation are selected for generating relevant metadata (e.g., information about actors/characters on screen, filming location, clothes worn by characters on screen, and/or the like) for the source video 121, whereas the splits between the frames 123 for perceptual hashing are selected for performing automatic content recognition (ACR) to identify the source video. For example, a frame with significant motion blur may not be useful for metadata generation if the motion blur is severe enough to make distinguishing the items appearing on-screen difficult or impossible and may be excluded from the metadata generation, but may still be useful for ACR because it is a visually unique image. Because the splits are selected different according to different criteria, the frames 127 chosen for metadata generation may or may not match or align directly with the frames 123 used to generate the hash vectors 125. As a result, the same source video 121 may yield different numbers of frames 123, 127 and/or frames 123, 127 with different time stamps for hash generation and for metadata generation.

A metadata generation processor 152 operates on the frames 127 chosen for metadata generation and stores the metadata, associated with a timestamp or other identifier for the corresponding frame 127, in the metadata database 150 (blocks 304 and 306). The metadata generation can be accomplished by a user or automatically with optional user intervention, e.g., using the technology disclosed in U.S. Patent Application Publication No. 2020/0134320 A1, entitled "Machine-Based Object Recognition of Video Content," which is incorporated herein by reference in its entirety. Automated frame ingestion and metadata generation can make metadata available for searching in just a few seconds (e.g., 5 seconds or less), making the process suitable for tagging and searching live video, such as sports, performances, and news. Examples of metadata that may be generated by the metadata processor 152 include information about what actors/characters are on screen, what clothing items are being worn by those actors/characters, or the filming location depicted on screen. This metadata generation can be done independently or in concert with the frame hashing illustrated in FIG. 2.

If desired, some or all of the metadata for the source video 101 can be updated after the metadata database is populated. For example, if a product tagged in the source video 101 is on sale, is no longer available, or is available from another vendor, then the corresponding entry in the metadata database 140 can be updated to reflect the change(s). An entry in the metadata database 140 can also be updated to include references to similar products available from other vendors. These updates can be performed without changing any of the entries in the hash database 140. And so long as the entries in the metadata database 150 include timestamps or other identifying information for the frames 127, they can be matched to the corresponding hashes in the hash database 140.

In some cases, the metadata database 150 stores metadata keyed to or associated with only the source video 101 and not with different versions of the source video. This metadata can be retrieved for different versions of the video using the timestamps and timestamp offsets described above. In other cases, the metadata database 150 stores metadata keyed to or associated with different versions of the source video 101 (e.g., a theatrical release and a shorter version edited for television). In these cases, a metadata database query may identify and return metadata associated with the corresponding version of the source video 101.

FIG. 4 illustrates how the playback device 110 and API server 130 query the hash database 140 and metadata database 150. The playback device 110 (e.g., a smart TV, set-top box, or other internet-connected display) displays a potentially modified version of the source video 121 to the viewer. This modified version may be edited (e.g., for content or length) or changed in format (e.g., played with a letterbox or cropped). It may also include commercials and other breaks.

As the viewer watches the modified version of the source video, the video playback device captures the image being displayed on its screen and generates a hash vector 115 from that image using the same perceptual hashing process (e.g., pHash, dHash, aHash, or wHash) used to generate the hash vectors 145 stored in the hash database 140 (block 404). The playback device 110 generates the hash vector 115 quickly, e.g., in 100 milliseconds or less, to keep latency as low as possible.

The playback device 110 can capture and hash the image in response to a viewer request or command made by pressing a button on a remote control or talking into a microphone on a remote control or other device. The playback device 110 may also or alternatively automatically capture and hash frames at regular intervals (e.g., every Nth frame or one frame every 1-300 seconds) and use the most recently derived hash vector 115 to perform the search in response to the viewer request. (If the playback device 110 can sense commercials or other program interruptions, it may stop generating hash vectors 115 during the commercials to reduce the processing load and/or bandwidth consumption.) Or the playback device 110 may instead use an automatically generated hash 115 to automatically perform a search in the background and display the results of that search in response to a subsequent viewer request. The playback device 110 may also use automatically retrieved results to prompt the viewer via an on-screen notification that metadata is available for the currently displayed video.

The playback device 110 sends one or more of these hash vectors 115 and, optionally, a frame timestamp and information identifying the video content to the API server 130 for identification of the people, items, and/or locations in the images (block 406). The playback device 110 may send each hash vectors 115 to the API server 130 or only a subset of the hash vectors 115 to the API server 130. For instance, if the playback device 110 computes the hash vectors 115 on a periodic basis, it may send each hash vector 115 to the API server 130. This consumes more bandwidth, but potentially reduces latency by sending requests for information from the API server 130 and receiving responses to those requests without waiting for commands from the viewer. As a result, the playback device 110 can display a response to a viewer's request for information about a person, object, or location displayed by the playback device without waiting for the database queries because those queries have already been performed.

Alternatively, or in addition, the playback device 110 may send hash vectors 115 to the API server 130 in response to a command from a viewer, whether those hash vectors 115 were generated periodically or in response to the command from a viewer. This consumes less bandwidth and reduces the processing load on the API server 130, the hash database 140, and the metadata database 150 by reducing the number of database queries. But it potentially increases latency by waiting to query the API server 130 until the viewer requests the information.

In some cases, the identity of the source video 121 shown by the playback device 110 content may already be known (for example, a smart TV or set-top box may know the identity of program shown on the TV), and the system 100 may just be used to identify an accurate timestamp for the corresponding frame of the source video 121. In these cases, the playback device 110 may send an identifier for the content in addition to the hash value 115. For example, the content identifier may be generated by an ancillary ACR system (e.g., Gracenote) or pulled from an electronic programming guide (EPG) info using a set-top box. The content identifier can then be used to restrict the search space or filter out false-positive matches from the hash database 140 based on the specified content.

Once the API server 130 receives the hash vector 115 from the playback device 110, the API server 130 queries the hash database 140 for a matching stored hash vector 145 (block 408). Because hashing is one-way, it may not be possible to determine the exact source value (video frame) that the hash was generated from. However, because the hash values 115 and 145 are generating using perceptual hashing (e.g., dHash), hashing similar source images yields similar hash values, so there is meaning in the positional relationships/distances between the hash values. This is in contrast to standard cryptographic hash algorithms, such as SHA or MD5, which are designed such that even a slight perturbation in the input produces dramatically different hash values.

If the search yields a similar hash vector 145, within a predefined strict threshold distance (block 410), the hash database 140 returns the timestamp of the matching frame to the API server 130. The distance threshold can be determined based on experimental data and the allowable false positive rate for a given use case (a higher threshold tends to give a higher true positive rate, but also a higher false positive rate). For example, the system 100 can be tested and adjusted using different thresholds to return a known ground-truth timestamp. The distance between hash vectors may be calculated using one of a variety of distance metrics, for example, L2 (Euclidean) distance or Hamming distance (if the vectors are binary). Alternatively, other notions of similarity, such as cosine similarity or cross correlation, may be used to compare hashes. In addition, the threshold may also be set differently for different videos, or on different shards of the hash database.

If no matches are found within the strict threshold distance, a less strict (looser) threshold can be used (block 412), with a consensus method employed to maintain false positive accuracy. For example, if the three closest matches with the looser threshold are all from the same source video 101 and have timestamps within a few seconds of each other, this provides more confidence that the closest match is correct, even if it falls outside the range of the strict threshold. If the three closest matches are from different source videos 101 and/or have timestamps separated by more than a few seconds, however, then it may be safer to assume there is no match. If no match is found, the API server 130 returns a null result to the playback device 110 (block 420).

If there is a matching hash in the hash database 140, the hash database query returns the timestamp and associated information about the source video 101 for the matching hash to the API server 130 (block 414). The API server 130 can send this timestamp to the playback device 110 and/or use this timestamp and associated source video information to query the metadata database 150 for the metadata for the matching frame (block 416). The metadata database 150 returns the requested metadata to the API server 130, which in turn transmits the requested metadata to the playback device 110 for display to the viewer (block 418). The playback device 110 displays the requested information to the viewer in an overlay appearing over or integrating with the video. The displayed information may include a link or other information that enables the viewer to purchase the product via the playback device 110 or another device, such as a smartphone or tablet. For more details on displaying the metadata to the viewer, see, e.g., U.S. Pat. No. 10,748,206 (issued from U.S. application Ser. No. 14/527,854), entitled "Dynamic Media-Product Searching Platform Apparatuses, Methods and Systems," which is incorporated herein by reference in its entirety.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of identifying a frame of a source video, the method comprising:
    generating hash vectors for respective frames of different versions of the source video;
    associating the hash vectors with information about the source video;
    separating the hash vectors into subsets;
    storing each subset in a different shard of a database;
    playing a first version of the source video on a playback device;
    generating a first hash vector for a first frame of the first version of the source video;
    matching the first hash vector to a matching hash vector among the hash vectors in the different shards of the database; and
    in response to matching the first hash vector to the matching hash vector, retrieving the information about the source video.

2. The method of claim 1, wherein the hash vectors and the first hash vector are generated with a perceptual hashing process.

3. The method of claim 1, wherein the first hash vector has a size of less than or equal to 4096 bits.

4. The method of claim 1, wherein generating the first hash vector occurs within about 100 milliseconds.

5. The method of claim 1, wherein generating the first hash vector occurs automatically at regular intervals.

6. The method of claim 1, wherein generating the first hash vector occurs in response to a command from a viewer.

7. The method of claim 1, wherein separating the hash vectors into subsets comprises separating the hash vectors randomly into subsets.

8. The method of claim 1, wherein separating the hash vectors into subsets comprises separating the hash vectors randomly into even subsets.

9. The method of claim 1, further comprising:
    generating a second hash vector for a second frame of the first version of the source video;
    matching the second hash vector to the matching hash vector;
    in response to matching the second hash vector to the matching hash vector, retrieving a timestamp corresponding to the second hash vector; and
    transmitting the timestamp to the playback device.

10. The method of claim 1, wherein the database is a first database and the information about the source video comprises metadata corresponding to the respective frames of the source video, and further comprising:
    storing the metadata corresponding to the respective frames in a second database,
    wherein retrieving the information about the source video comprises retrieving the metadata corresponding to the matching hash vector from the second database.

11. The method of claim 10, wherein the metadata represents at least one of a location in the source video, a garment worn by an actor in the source video, a product appearing in the source video, or music playing the source video.

12. The method of claim 10, wherein the hash vectors are associated with the metadata by respective timestamps, and wherein retrieving the metadata comprises:

querying the second database based on a timestamp associated with the matching hash vector; and retrieving the metadata associated with the timestamp from the second database.

13. The method of claim 10, further comprising:

displaying the metadata to a viewer via the playback device.

14. The method of claim 13, wherein the playback device includes at least one of a television, a set-top box, a computer, or a mobile device.

15. The method of claim 1, wherein matching the first hash vector to the matching hash vector comprises:

determining that the first hash vector is within a threshold distance of the matching hash vector.

16. The method of claim 1, wherein the matching hash vector is for a frame in a second version of the source video different than the first version of the source video.

17. The method of claim 1, wherein matching the first hash vector to the matching hash vector comprises:

transmitting the first hash vector to an Application Programming Interface (API) server;

determining, via the API server, that the first hash vector matches the matching hash vector; and in response to matching the first hash vector to the matching hash vector, identifying a timestamp associated with the matching hash vector.

* * * * *